United States Patent [19]

Abe et al.

[11] Patent Number: 4,569,459
[45] Date of Patent: Feb. 11, 1986

[54] FASTENING METHOD FOR A CASING

[75] Inventors: Minoru Abe, Katano; Tetuo Rikitake, Neyagawa, both of Japan

[73] Assignee: Kabushiki Kaisha Daikin Seisakusho, Osaka, Japan

[21] Appl. No.: 705,292

[22] Filed: Feb. 25, 1985

[51] Int. Cl.$^4$ .................... B65D 41/06; B65D 41/36
[52] U.S. Cl. .................................... 220/293; 220/295
[58] Field of Search ................... 220/293, 295, 303

[56] References Cited

U.S. PATENT DOCUMENTS 3,628,096 12/1971 Drew et al. ........................ 220/293
3,768,691 10/1973 Cobb et al. ........................ 220/293

Primary Examiner—George T. Hall
Attorney, Agent, or Firm—Armstrong, Nikaido, Marmelstein & Kubovcik

[57] ABSTRACT

A fastening method of a casing etc., wherein a slit having an inclined surface extending substantially in a circumferential direction and coming up to a first flange side with an approach from a central portion to either side of the circumferential direction, is formed on a cylindrical part at an outer peripheral end of a second casing member, a part of the cylindrical part having said inclined surface is pressed in a casing inner side after fitting the second flange in the cylindrical part, thereby pressing the second flange on a first flange side by means of the inclined surface.

4 Claims, 5 Drawing Figures

FASTENING METHOD FOR A CASING

BACKGROUND OF THE INVENTION

1. Field of Industrial Usefulness

This invention relates to a fastening method of a casing etc. having a pair of casing members. As a casing to which the present invention is applicable, there are a casing for a double diaphragm type actator, a casing for a brake booster, various casings such as a pump casing etc., and various containers similar to a casing.

2. Prior Art

There have conventionally been many methods for fastening opening ends of a pair of casing members. For example, there have been a bolt fastening method, a swage fastening method, and a method for fastening stoppers by pressing and twisting a flange of a casing member against another.

In the bolt fastening method or the fastening method utilizing the twisting, however, many manhours are required for assembly work. While, a strength (fastening force) of a fastened portion is questionable in the swage fastening method.

OBJECT OF THE INVENTION

An object of this invention is to provide a fastening method of a casing etc. enabling easy assembly work and always maintaining a high fastening force of a fastened portion.

In order to accomplish the above object, in this invention, outward first and second flanges are formed on outer peripheral ends of opening ends of first and second casing members respectively, a cylindrical part is formed on the outer peripheral end of the first flange, a slit is formed on the cylindrical part, which has an inclined surface extending substantially in a circumferential direction and coming up to the first flange side with an approach from a circumferential central part to an either end part, a part of the cylindrical part having said inclined surface is pressed in a casing inner side after fitting the second flange in the cylindrical part, thereby pressing the second flange on the first flange side by means of the inclined surface and fastening the both casing members.

DETAILED DESCRIPTION OF THE INVENTION

Figure 1:
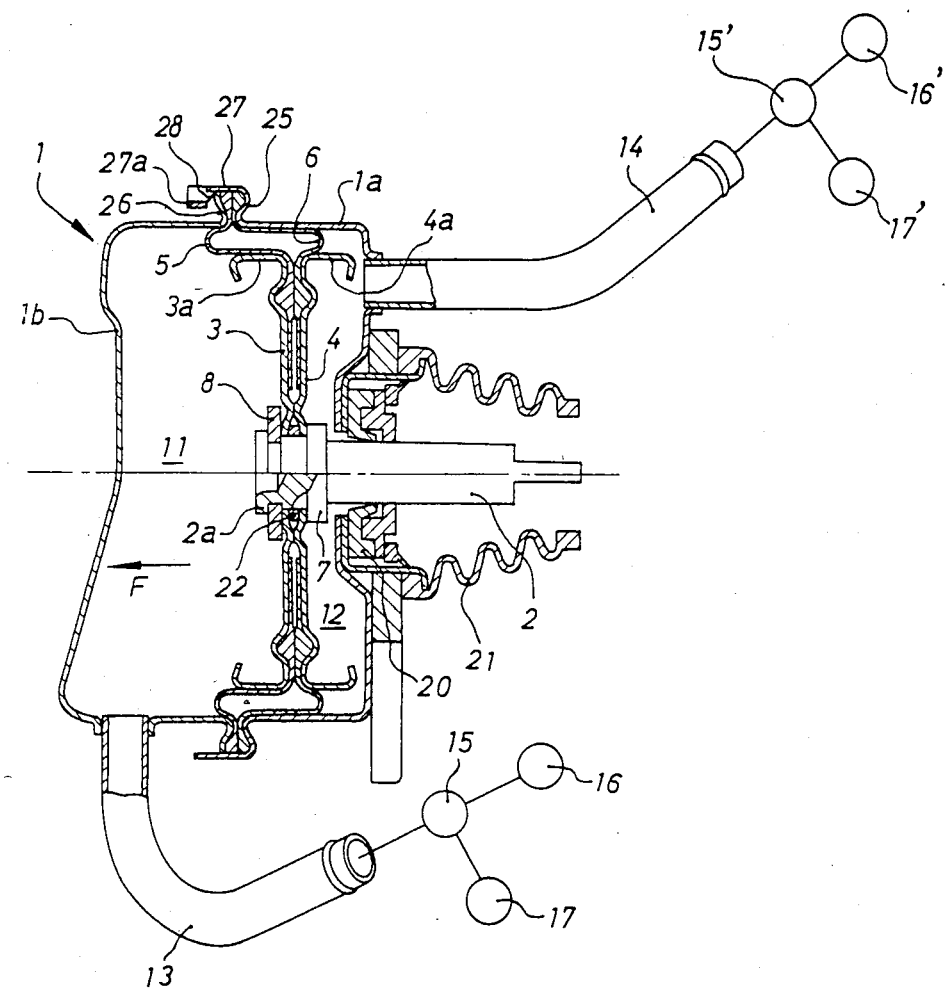
FIG. 1 is a vertical sectional view (taken on a line I—I of FIG. 5) of a double diaphragm type actuator having a casing assembled in accordance with the present invention.

FIG. 1 shows a double diaphragm type actuator assembled according to this invention and a general construction of this actuator will be described first. A cylindrical actuator casing 1 has dish-like first and second casing members 1a and 1b. Outward first and second flanges 25, 26 are formed on outer peripheral ends of opening ends of the both casing members 1a and 1b respectively, and the both flanges 25 and 26 are fastened in accordance with the fastening method of the present invention.

A moving rod 2 is inserted in the casing 1 freely movably in the axial direction, and a pair of annular first and second piston plates 3, 4 and a pair of annular first and second rubber diaphragms 5, 6 are fixed to a casing 1 side end of the rod 2. The both rubber diaphragms 5 and 6 are held between the both piston plates 3 and 4, and the both piston plates 3 and 4 are held between a flange 7 of the rod 2 and a presser ring 8. The flange 7 is formed integrally with the rod 2, and the presser ring 8 is so stopped as to be prevented from slipping off through means of a swaged part 2a by swaging a tip end of the rod 2, for example. Cylindrical rubber guides 3a and 4a are formed on outer peripheral ends of the both piston plates 3 and 4 respectively.

Outer peripheral ends of the both rubber diaphragms 5 and 6 are held between the first and second flanges 25, 26, and an inside of the casing 1 is divided into a first chamber 11 and a second chamber 12 by means of the both diaphragms 5, 6 and the both piston plates 3, 4. A chamber on which the first rubber diaphragm 5 and the first piston plate 3 face is the first chamber 11, and a chamber on which the second rubber diaphragm 6 and the second piston plate 4 face is the second chamber. The rubber guide 3a of the first piston plate 3 projects toward a first chamber 11 side and the first rubber diaphragm 5 is curved convexly toward the first chamber 11 side and at the same time supported by the rubber guide 3a of the first piston plate 3 so as not to stretch toward a rod center side. The rubber guide 4a of the second piston plate 4 projects toward a second chamber 12 side, and the second rubber diaphragm 6 is curved convexly toward the second chamber 12 side and at the same time supported by the rubber guide 4a of the second piston plate 4 so as not to stretch toward the rod center side.

The chambers 11 and 12 are interconnected changeably to negative pressure supplies 16, 16' and atmospheres 17, 17' through first and second pipes 13, 14 and change-over valves 15, 15' respectively. Namely, the second chamber 12 is interconnected to the negative pressure supply 16' in case when the first chamber 11 is connected to the atmosphere 17, while the second chamber 12 is interconnected to the atmosphere 17' in case when the first chamber 11 is connected to the negative pressure supply 16'.

An actuator as shown in FIG. 1 is utilized for operation of an auxiliary transmission of an automobile such as a four-wheel drive vehicle, for example. The rod 2, for instance, extends in the auxiliary transmission to be coupled with an auxiliary transmission shaft to switch the auxiliary transmission between a four-wheel drive and a two-wheel drive, for example. In FIG. 1, 20 is a seal, 21 is a protective boot, and 22 is an O-ring.

A fastening method of the casing members 1a and 1b will be described hereunder.

Figure 2:
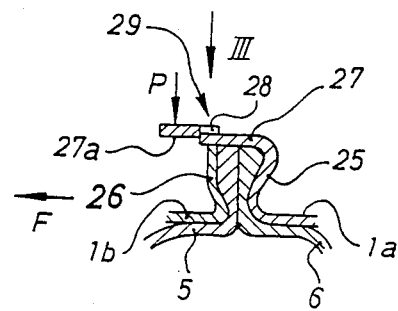
FIG. 2 is an enlarged vertical sectional partial view (taken on a line II—II of FIG. 2) of a casing before being assembled.

(1) As shown in FIG. 2, the outward first and second flanges are formed on the outer peripheral ends of opening ends of the both casing members 1a and 1b. The first flange 25 is formed substantially into a Z-shape at its outer peripheral end so as to become inflated in a direction opposite to an arrow F, and the second flange 26 is so formed as to slightly extends in a direction of the arrow F.

(2) Simultaneously with the formation of the first flange 25, a cylindrical part 27 extending in the direction of the arrow F is integrally formed on an outer peripheral end of the first flange 25.

Figure 3:
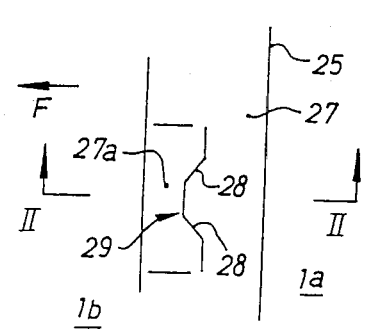
FIG. 3 is a drawing viewed in an arrow III of FIG. 2.

(3) A slit 29 is formed on the cylindrical part 27, which has an inclined surface 28 extending substantially in a circumferential direction and coming up to the first flange 25 side (the side opposite to the direction of the arrow F) with an approach from a circumferential central part to an end part as shown in FIG. 3. The slit 29 is formed, for example, by cutting and raising slightly toward outside a part of an arrow F side end of the cylindrical part 27 as shown in FIG. 2. The slit 29 is provided at six places, for instance, spaced equally in the circumferential direction.

(4) The outer peripheral ends of the rubber diaphragms 5 and 6 are inserted in between the both flanges 25, 26, and the second flange 26 is fitted into the cylindrical part 27.

Figure 4:
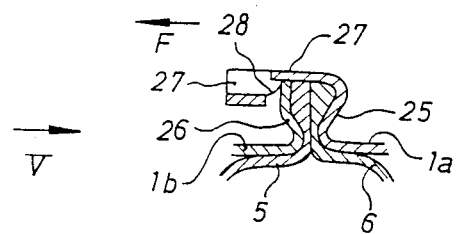
FIG. 4 is an enlarged vertical sectional partial view (taken on a line IV—IV of FIG. 5) of a casing after being assembled.

(5) The part 27a of the cylindrical part 27 is pressed into the casing (in a direction of arrow P) by using an appropriate pressing machine. As the part 27a projects in a direction of the arrow P, the second flange 26 is pressed through the diaphragms 5 and 6 on the first flange 25 by a wedge action of the inclined surface 28. Namely, as the part 27a projects in the direction of the arrow P, a portion of the inclined surface 28 contacting with the second flange 26 moves from a circumferential central part to an either end side, thereby the second flange 26 being tightened to the first flange 25 side to fasten the both casing members 1a and 1b together as shown in FIG. 4.

Figure 5:
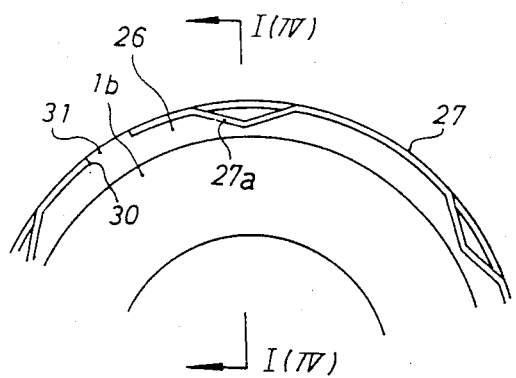
FIG. 5 is a drawing viewed in an arrow V of FIG. 4.

Incidentally, 30 of FIG. 5 is a positioning notch formed on the cylindrical part 27, and an outward projection 31 of the second flange 26 engages with the notch 30.

Function of actuator

When the first chamber 11 is interconnected to the atmosphere 17 and the second chamber 12 is interconnected to the negative pressure supply 16' by switching the change-over valves 15 and 15', the rod 2 moves in the direction opposite to the arrow F up to the position as illustrated in FIG. 1 to switch the auxiliary transmission to the four-wheel drive side, for example.

When the first chamber 11 is interconnected to the negative pressure supply 16 and the second chamber 12 is interconnected to the atmosphere 17', the rod 2 moves from the position shown in FIG. 1 in the direction of F to switch the auxiliary transmission to the two-wheel drive side for example.

Another embodiment (1) This invention is applicable also to a casing for a brake booster, a pump casing, and containers similar to a casing.

(2) The slit may be formed simultaneously when the flange and the cylindrical part are formed or after the cylindrical part etc. are formed.

Effect of the Invention

The cylindrical part 27 is formed on the outer peripheral end of the first flange 25, the slit 29 is formed on the cylindrical part 27, which has the inclined surface 28 extending substantially in the circumferential direction and coming up to the first flange 25 side with an approach from the central portion to either side of circumferential direction, the part 27a of the cylindrical part 27 having said inclined srface 28 is pressed in the casing inner side after fitting the second flange 26 in the cylindrical part 27, thereby pressing the second flange 26 on the first flange 25 side by means of the inclined surface 28, so that the following advantages are obtainable.

(1) The both casing members 1a and 1b can be fastened by only pressing the part 27a of the cylindrical part 27 on the casing inner side when assembling them and it becomes unnecessary to relatively twist the casing members 1a and 1b, so that the assembly work becomes easy.

(2) The both casing members 1a and 1b can be fastened by only preparing the pressing means for pressing the part 27a of the cylindrical part 27, so that assembling apparatuses other than the pressing means are not required in assembling them. Therefore, an assembling cost can be saved.

(3) The second flange 26 is pressed on the first flange 25 side by so called "wedge action" utilizing the inclined surface 28 and further the pressure is always exerted by the spring action of the cylindrical part 27 itself, so that the tightening force between the flanges 25 and 26 can be always kept large. Namely, the both flanges 25 and 26 can be fastened firmly.

What is claimed is:

1. A fastening method of a casing etc., wherein outward first and second flanges are formed on outer peripheral ends of opening ends of first and second casing members respectively, a cylindrical part is formed on an outer peripheral end of the first flange, a slit is formed on the cylindrical part, which has an inclined surface extending substantially in a circumferential direction and coming up to a first flange side with an approach from a central portion to either side of the circumferential direction, a part of the cylindrical part having said inclined surface is pressed in a casing inner side after fitting the second flange in the cylindrical part, thereby pressing the second flange on a first flange side by means of the inclined surface and fastening the both casing members.

2. A fastening method of a casing etc. as set forth in claim 1, in which said method is applied to a casing of a double diaphragm type actuator.

3. A fastening method of a casing etc. as set forth in claim 2, in which outer peripheral ends of rubber diaphragms are held between the first and the second flanges.

4. A fastening structure of a casing etc., wherein outward first and second flanges are formed on outer peripheral ends of opening ends of first and second casing members respectively, a cylindrical part in which the second flange fits is formed on an outer peripheral end of the first flange, a cut and raised portion projecting to an inner side is formed on said cylindrical part, an angular inclined surface is formed on the cut and raised portion, which comes up to the first flange side with an approach from a central part to an end part of a circumferential direction, and said inclined surface is made contact with the second flange.

* * * * *

UNITED STATES PATENT AND TRADEMARK OFFICE
CERTIFICATE OF CORRECTION

PATENT NO. : 4,569,459
DATED : February 11, 1986
INVENTOR(S) : MINORU ABE ET AL

It is certified that error appears in the above-identified patent and that said Letters Patent is hereby corrected as shown below:

On the cover page, after Item [22], insert ---

[30]   Foreign Application Priority Data

February 24, 1984   Japan............ 59-34883 ---.

Signed and Sealed this

Fifth Day of August 1986

[SEAL]

Attest:

DONALD J. QUIGG

Attesting Officer      Commissioner of Patents and Trademarks